US009940281B2

(12) United States Patent
Cho et al.

(10) Patent No.: US 9,940,281 B2
(45) Date of Patent: Apr. 10, 2018

(54) METHOD AND APPARATUS FOR CONTROLLING PERFORMANCE OF ELECTRONIC DEVICE

(71) Applicant: Samsung Electronics Co., Ltd., Suwon-si, Gyeonggi-do (KR)

(72) Inventors: Ilhyun Cho, Seoul (KR); Soonwan Kwon, Yongin-si (KR); Kibeom Kim, Seoul (KR); Rakie Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 14/824,476

(22) Filed: Aug. 12, 2015

(65) Prior Publication Data

US 2016/0048190 A1    Feb. 18, 2016

(30) Foreign Application Priority Data

Aug. 12, 2014 (KR) ........................ 10-2014-0104679

(51) Int. Cl.
| | | |
|---|---|---|
| *G06F 13/40* | (2006.01) | |
| *G06F 3/01* | (2006.01) | |
| *G06F 1/32* | (2006.01) | |
| *G06F 3/023* | (2006.01) | |
| *G06F 3/0488* | (2013.01) | |

(52) U.S. Cl.
CPC .......... *G06F 13/4022* (2013.01); *G06F 1/324* (2013.01); *G06F 1/3215* (2013.01); *G06F 1/3243* (2013.01); *G06F 1/3296* (2013.01); *G06F 3/023* (2013.01); *G06F 3/04886* (2013.01); *Y02B 60/1217* (2013.01); *Y02B 60/1235* (2013.01); *Y02B 60/1239* (2013.01); *Y02B 60/1285* (2013.01)

(58) Field of Classification Search
CPC ........ G06F 1/32; G06F 1/3287; G06F 1/3234; G06F 1/3203; G06F 1/3231; G06F 1/3206; Y02B 60/1217; Y02B 60/1285; Y02B 60/1289; Y02B 60/18; G06K 15/4055; H04W 52/02
USPC ................................................ 713/300–323
See application file for complete search history.

(56) References Cited

U.S. PATENT DOCUMENTS

| | | | | |
|---|---|---|---|---|
| 7,647,513 | B2 * | 1/2010 | Tobias ................. | G06F 1/3203 713/300 |
| 8,762,356 | B1 | 6/2014 | Kogan | |
| 2002/0124197 | A1 * | 9/2002 | Atkinson .............. | G06F 1/3203 713/322 |
| 2006/0265648 | A1 | 11/2006 | Rainisto et al. | |
| 2007/0067455 | A1 * | 3/2007 | Gursky ................. | G06F 9/485 709/225 |

(Continued)

FOREIGN PATENT DOCUMENTS

JP    5067300 B2    8/2012

*Primary Examiner* — Bryan Earles
(74) *Attorney, Agent, or Firm* — Jefferson IP Law, LLP

(57) ABSTRACT

A method for controlling performance of an electronic device is provided. The method includes sensing user input, predicting user input speed, and controlling at least one processing unit of the electronic device based on a predicted user input speed and performance assignment information. Here, the performance assignment information includes control information mapped respectively with user input speeds for controlling the at least one processing unit of the electronic device.

20 Claims, 9 Drawing Sheets

(56) References Cited

U.S. PATENT DOCUMENTS

| | | | |
|---|---|---|---|
| 2008/0005599 A1* | 1/2008 | Theocharous | G06F 1/3203 |
| | | | 713/300 |
| 2009/0158144 A1 | 6/2009 | Griffin | |
| 2011/0201387 A1 | 8/2011 | Paek et al. | |
| 2014/0032218 A1 | 1/2014 | Yeung | |
| 2014/0062886 A1* | 3/2014 | Pasquero | G06F 3/0237 |
| | | | 345/168 |
| 2014/0067372 A1 | 3/2014 | Pasquero et al. | |
| 2015/0074436 A1* | 3/2015 | Jain | G06F 1/324 |
| | | | 713/322 |

* cited by examiner

FIG. 5

| CPU Performance Domain | | | | | | |
|---|---|---|---|---|---|---|
| Number of characters /sec | Big/Little Switch | Clock (MHz) | Qos (Bus Access) | Voltage (V) | Multiple Outstanding | Bandwidth Limit |
| 1 | L | 200 | High | 0.95 | Max | X |
| 2 | L | 300 | High | 0.95 | Max | X |
| 3 | L | 400 | High | 0.95 | Max | X |
| 4 | L | 500 | High | 0.95 | Max | X |
| 5 | L | 600 | High | 0.95 | Max | X |
| 6 | L | 700 | High | 1.0 | Max | X |
| 7 | L | 800 | Middle | 1.0 | Max | X |
| 8 | B | 900 | Middle | 1.0 | Max | X |
| 9 | B | 1000 | Middle | 1.0 | Max | X |
| 10 | B | 1100 | Middle | 1.25 | Max | X |
| 11 | B | 1200 | Middle | 1.25 | Max | X |
| 12 | B | 1300 | Low | 1.25 | Max | X |
| 13 | B | 1400 | Low | 1.3 | Max | X |
| 14 | B | 1500 | Low | 1.3 | Max | X |
| 15 | B | 1600 | Low | 1.3 | Max | X |

(a)

| GPU Performance Domain | | | | | |
|---|---|---|---|---|---|
| Number of characters /sec | Clock (MHz) | Qos (Bus Access) | Voltage (V) | Multiple Outstanding | Bandwidth Limit |
| 1 | 100 | High | 0.9 | Middle | 16 |
| 2 | 100 | High | 0.9 | Middle | 16 |
| 3 | 177 | High | 0.9 | Middle | 16 |
| 4 | 177 | High | 0.9 | Middle | 16 |
| 5 | 266 | High | 0.925 | Middle | 16 |
| 6 | 266 | High | 0.925 | Middle | 16 |
| 7 | 266 | Middle | 0.925 | Middle | 16 |
| 8 | 350 | Middle | 0.925 | Middle | 32 |
| 9 | 350 | Middle | 1.1 | Low | 32 |
| 10 | 350 | Middle | 1.1 | Low | 32 |
| 11 | 480 | Middle | 1.1 | Low | 32 |
| 12 | 480 | Low | 1.15 | Low | 32 |
| 13 | 480 | Low | 1.15 | Low | 32 |
| 14 | 533 | Low | 1.15 | Low | 32 |
| 15 | 533 | Low | 1.15 | Low | 32 |

(b)

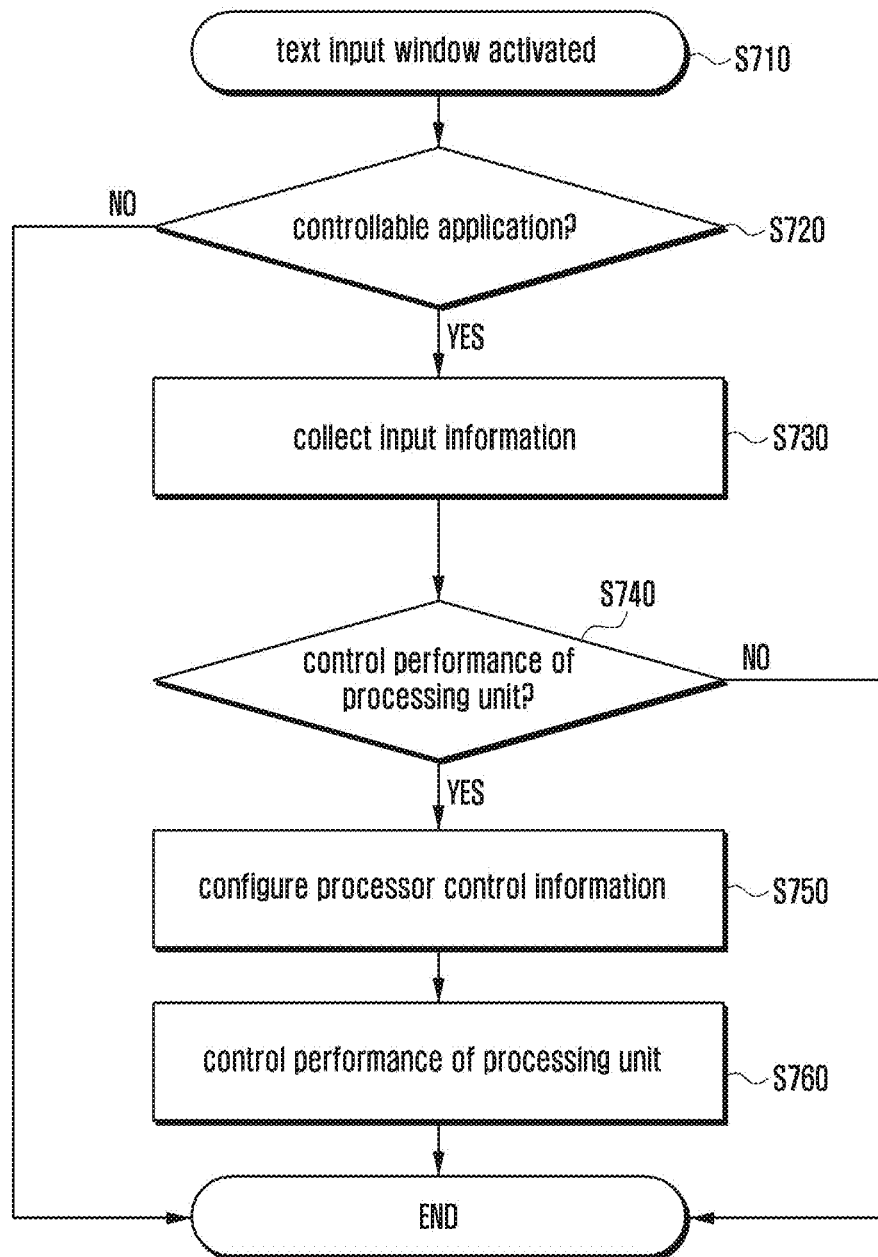

METHOD AND APPARATUS FOR CONTROLLING PERFORMANCE OF ELECTRONIC DEVICE

CROSS-REFERENCE TO RELATED APPLICATION(S)

This application claims the benefit under 35 U.S.C. § 119(a) of a Korean patent application filed on Aug. 12, 2014 in the Korean Intellectual Property Office and assigned Serial number 10-2014-0104679, the entire disclosure of which is hereby incorporated by reference.

TECHNICAL FIELD

The present disclosure relates to an electronic device. More particularly, the present disclosure relates to a method and apparatus for controlling performance of processing units constituting an electronic device.

BACKGROUND

In recent years, electronic devices such as mobile terminals have evolved into multimedia devices supporting various supplementary services including electronic memos, gaming, and schedule management. As such, mobile terminals have been developed so that users may use various supplementary services in a convenient manner.

However, a high-performance mobile terminal consumes a large amount of power for operation, thereby reducing the battery usage time.

Meanwhile, utilization of applications using text input is increasing. However, the mobile terminal does not have to exhibit high performance to receive text input.

Hence, it is desired to develop a scheme that enables a mobile terminal to efficiently manage power consumption when an application using text input is executed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a scheme that controls performance of at least one processing unit constituting an electronic device by predicting user input speed based on user input information.

In accordance with an aspect of the present disclosure, an electronic device capable of controlling at least one processing unit is provided. The electronic device includes a communication unit configured to communicate with another network entity, an input unit configured to sense user input, and a control unit configured to perform a process of predicting user input speed, and to control at least one processing unit of the electronic device based on a predicted user input speed and performance assignment information, wherein the performance assignment information includes control information mapped respectively with user input speeds for controlling the at least one processing unit of the electronic device.

In accordance with another aspect of the present disclosure, an electronic device capable of controlling at least one processing unit is provided. The electronic device includes a communication unit configured to communicate with another network entity, an input unit configured to sense user input, and a control unit configured to perform a process of collecting user input information, to predict user input speed based on the collected user input information, and to control at least one processing unit of the electronic device based on the predicted user input speed and performance assignment information, wherein the performance assignment information includes control information mapped respectively with user input speeds for controlling the at least one processing unit of the electronic device.

In accordance with another aspect of the present disclosure, a method for controlling performance of an electronic device is provided. The method includes sensing user input, predicting user input speed, and controlling at least one processing unit of the electronic device based on a predicted user input speed and performance assignment information, wherein the performance assignment information includes control information mapped respectively with user input speeds for controlling the at least one processing unit of the electronic device.

In accordance with another aspect of the present disclosure, a method for controlling performance of an electronic device is provided. The method includes sensing user input, collecting user input information, predicting user input speed based on the collected user input information, and controlling at least one processing unit constituting the electronic device based on a predicted user input speed and performance assignment information, wherein the performance assignment information includes control information mapped respectively with user input speeds for controlling the at least one processing unit of the electronic device.

In a feature of the present disclosure, the electronic device may predict user input speed based on user input information and configure processor control information accordingly, thereby reducing unnecessary power consumption.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a control information assignment table according to an embodiment of the present disclosure;

FIG. 7 is a flowchart of a procedure for controlling performance and resources of at least one processing unit in real time according to an embodiment of the present disclosure.

Throughout the drawings, it should be noted that like reference numbers are used to depict the same or similar elements, features, and structures.

DETAILED DESCRIPTION

Figure 1:
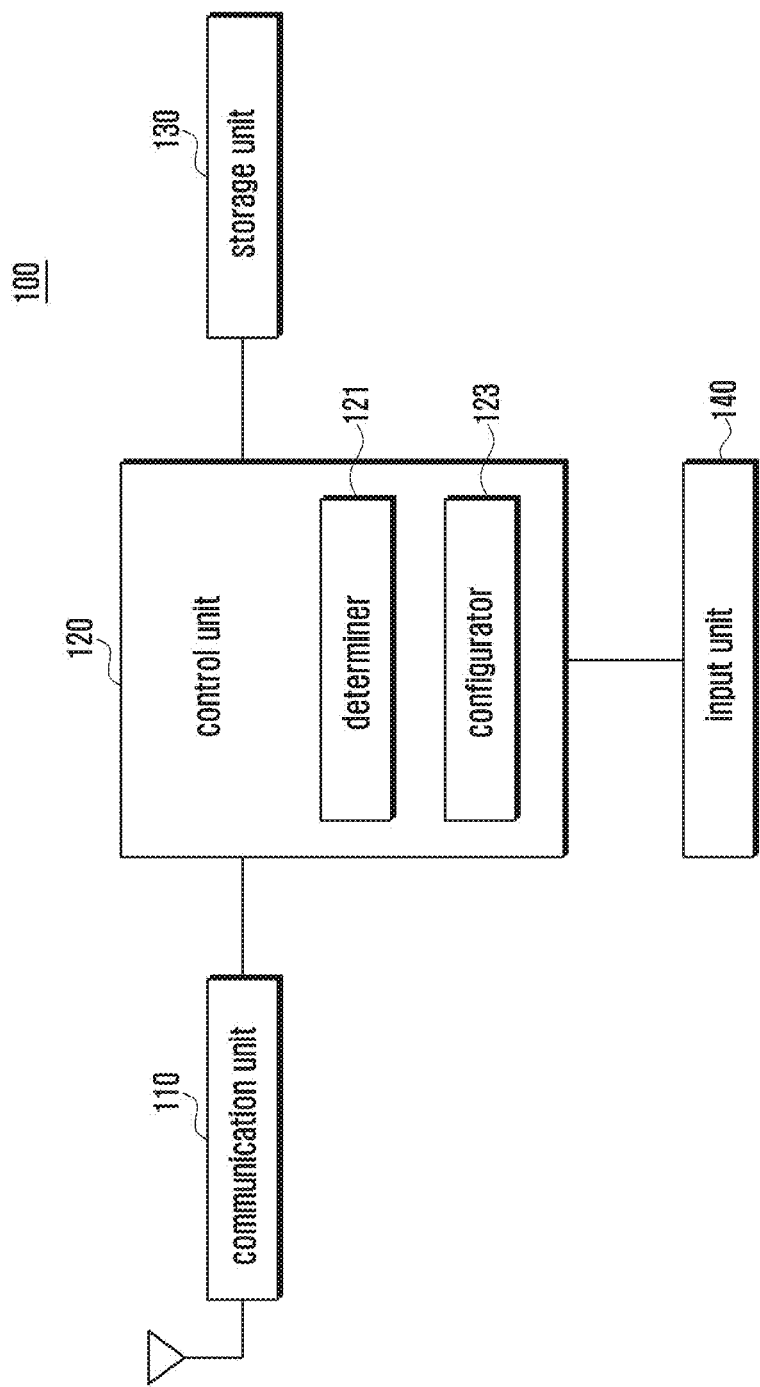
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, some elements are exaggerated or only outlined in brief, and thus may be not drawn to scale. The same reference symbols are used throughout the drawings to refer to the same or like parts.

Particular terms or words may be defined to describe the present disclosure in the best manner. Accordingly, the meaning of specific terms or words used in the specification and the claims should be construed in accordance with the spirit of the present disclosure.

FIG. 1 is a block diagram of an electronic device 100 according to an embodiment of the present disclosure.

Referring to FIG. 1, the electronic device 100 may include a communication unit 110 to communicate with an external network entity, a control unit 120 to control performance of one or more processing units constituting the electronic device 100, a storage unit 130 to store information (referred to as processor control information) used to configure control information for one or more processing units constituting the electronic device 100, and an input unit 140 to sense and receive user input.

The communication unit 110 may receive information used to configure processor control information and may send such information to another electronic device. For example, this information may be performance assignment information, which indicates control information for controlling at least one processing unit constituting the electronic device. The performance assignment information may be defined for each user input speed. The performance assignment information may be computed in advance and stored in the storage unit 130. When the specification of the electronic device is changed (e.g., upgrading of the electronic device), the communication unit 110 may receive new performance assignment information.

The control unit 120 may include a determiner 121 to determine whether to collect user input information, and a configurator 123 to predict user input speed based on the user input information and to configure the processor control information.

When user input is detected at the determiner 121, the determiner 121 may determine whether to collect user input information. When the determiner 121 determines not to collect user input information, the configurator 123 may use already collected user input information to configure the processor control information and control performance of at least one processing unit constituting the electronic device based on the configured processor control information. Alternatively, the configurator 123 may use pre-configured processor control information to control at least one processing unit.

When the determiner 121 determines to collect user input information, the configurator 123 collects user input information. The configurator 123 may predict user input speed based on the collected user input information. A technique to predict user input speed is described later.

The configurator 123 may configure new processor control information by use of the predicted user input speed. The configurator 123 may use the performance assignment information to configure new processor control information. That is, the configurator 123 may identify control information for controlling performance of at least one processing unit corresponding to the predicted user input speed in the performance assignment information.

The configurator 123 may control performance of at least one processing unit constituting the electronic device by use of the newly configured processor control information.

The storage unit 130 may store information used to configure the processor control information. For example, information for controlling performance of a processing unit may be performance assignment information.

The input unit 140 may sense user input. When a text input window is activated, the input unit 140 may detect user input.

Figure 2:
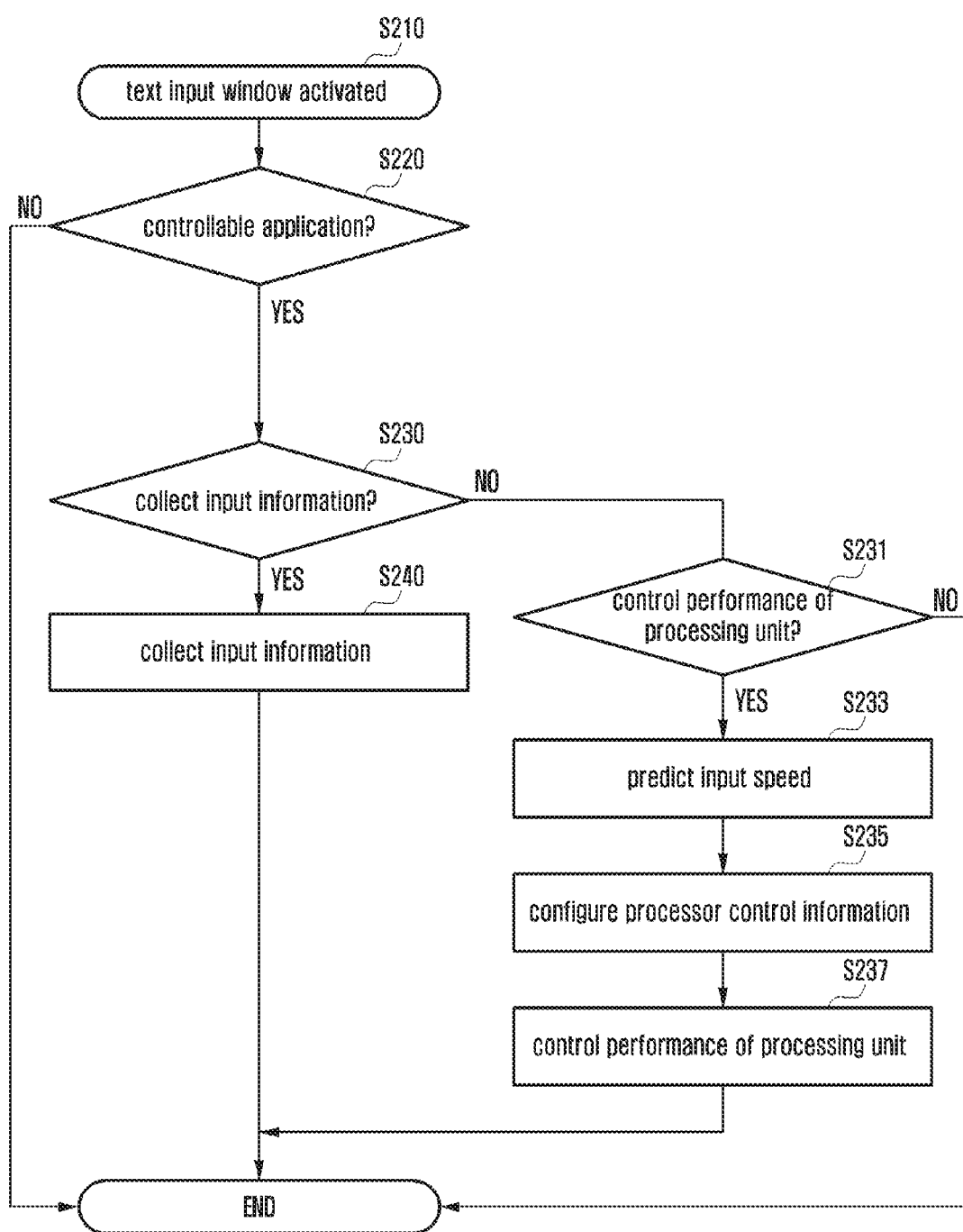
FIG. 2 is a flowchart of a procedure for controlling performance and resources of at least one processing unit constituting the electronic device according to an embodiment of the present disclosure.

FIG. 2 is a flowchart of a procedure for controlling performance of at least one processing unit constituting the electronic device according to an embodiment of the present disclosure.

Referring to FIG. 2, at operation S210, the electronic device determines whether a text input window is activated. If a text input window is activated, at operation S220, the electronic device determines whether the current application is text-based and permits controlling of processing unit performance (hereinafter, a text-based application allowing for the control of processing unit performance is referred to as a controllable application). A technique to determine controllability of an application is described later.

If the current application is not a controllable application, the electronic device ends the procedure. If the current application is a controllable application, at operation S230, the electronic device determines whether to collect user input information. User input information may be collected to configure the processor control information.

When already collected user input information is present or when there is no need to change existing processor control information, the electronic device may determine not to collect user input information.

Upon determining not to collect user input information, at operation S231, the electronic device determines whether to control performance of at least one processing unit. Upon determining not to control performance of at least one processing unit, the electronic device ends the procedure.

Upon determining to control performance of at least one processing unit, at operation S233, the electronic device predicts user input speed based on already collected user input information. A technique to predict user input speed is described later.

At operation S235, the electronic device configures processor control information based on the predicted user input speed. At operation S237, the electronic device controls performance of at least one processing unit according to the configured processor control information.

Here, the processor control information indicates the operating range of a processing unit where power consumption is minimized with respect to the user input speed.

Upon determining to collect user input information at operations S210 and S220, the electronic device collect user input information. The electronic device may collect user input information on a periodic basis or upon detection of a change in user input. The electronic device may also collect user input information when no user input information is stored in the storage unit 130. The user input information may include information regarding the time taken by the user to enter text and the number of characters (or strokes) in the input text. For example, when "hello" is entered, the number of characters is 5 ('h', 'e', 'l', 'l', 'o'). The user input information may also include information on the performance of a currently allocated processing unit (referred to as processor performance information).

Figure 3A:
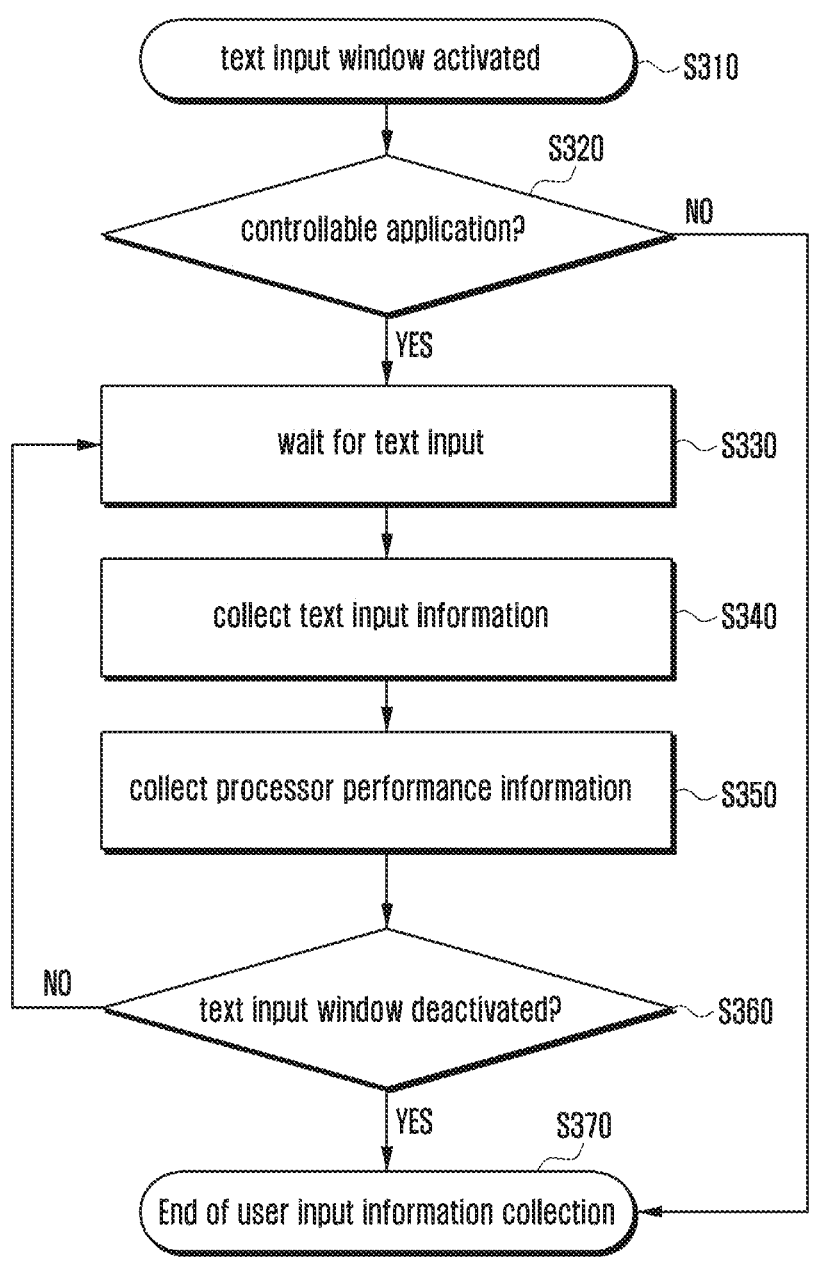
FIG. 3A is a flowchart of a procedure for collecting user input information according to an embodiment of the present disclosure.

FIG. 3A is a flowchart of a procedure for collecting user input information (operation S240 of FIG. 2 upon determining to collect user input information at operation S230) according to an embodiment of the present disclosure.

Referring to FIG. 3A, when a text input window is activated at operations S310 and S320, the electronic device determines whether the current application is a controllable application. To this end, the electronic device may pre-store a list of controllable applications and compare the current application with the list. That is, the electronic device may determine whether the current application is on the stored list of controllable applications, and may determine that the current application is a controllable application when the current application is on the list.

Upon determining that the current application is not a controllable application, the electronic device ends the procedure for input information collection at operation S370.

Upon determining that the current application is a controllable application, at operation S330, the electronic device waits for text input by the user.

When the user enters text, at operation S340, the electronic device collects user input information. The user input information may include information regarding the time taken by the user to enter text and the number of characters entered during the time. The electronic device may predict user input speed by use of the user input information. How to predict user input speed is described later.

At operation S350, the electronic device collects processor performance information. The electronic device compares the processor performance information with the processor control information configured at operation S215 of FIG. 2 and determines whether to control a corresponding processing unit utilizing the configured processor control information. This is described in more detail later.

When the user input is stopped, at operation S360, the electronic device determines whether the text input window is deactivated. When the text input window is deactivated, at operation S370, the electronic device ends user input information collection. When the text input window is not deactivated, the procedure returns to operation S330 at which the electronic device waits for user input.

Figure 3B:
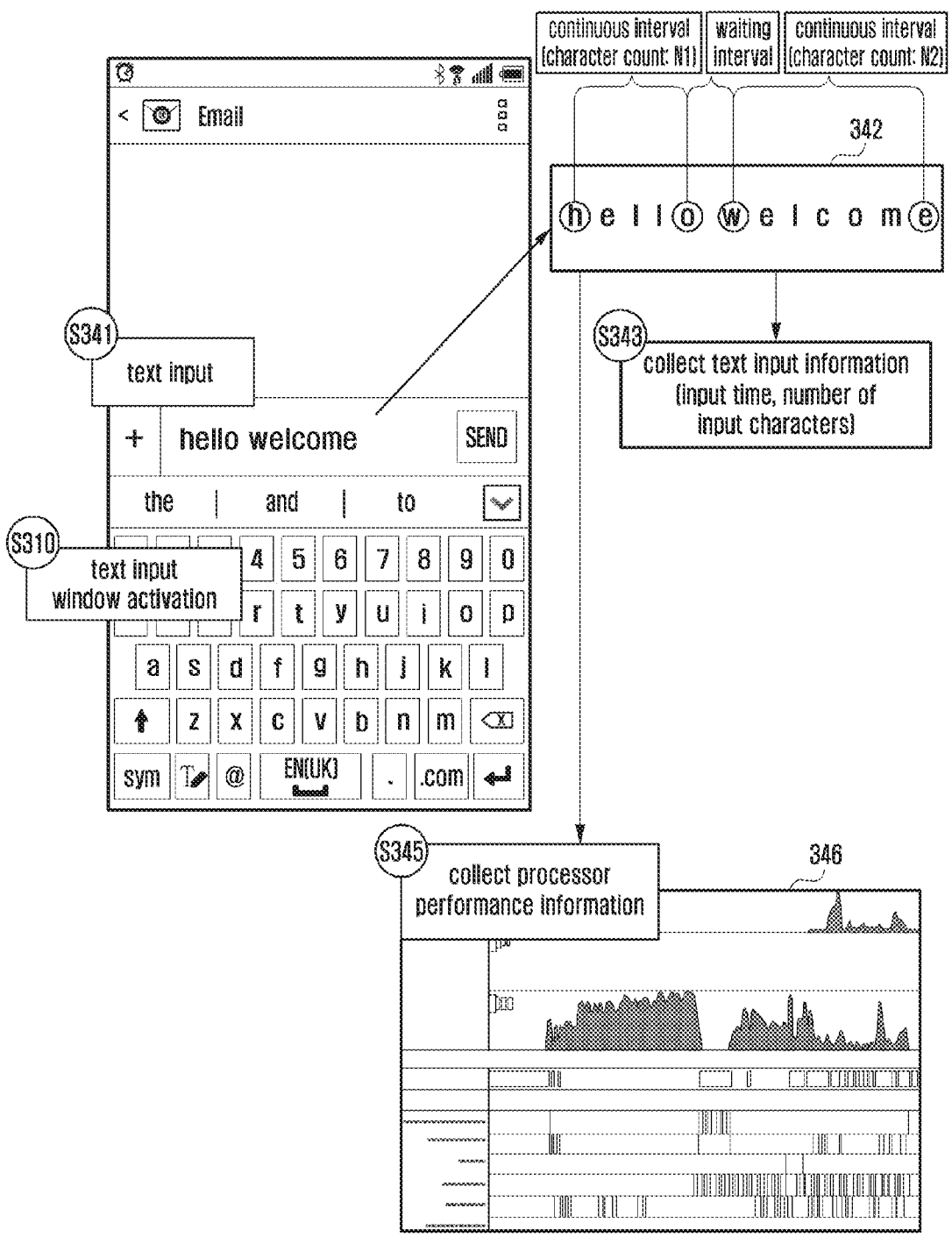
FIG. 3B depicts a series of operations to collect user input information according to an embodiment of the present disclosure.

FIG. 3B depicts a series of operations to collect user input information according to an embodiment of the present disclosure.

Referring to FIG. 3B, when a text input window is activated at operations S310 and S341, the electronic device receives text input from the user. When user text input is received, at operation S343, the electronic device collects user input information.

The user input information collected at operation S343 may include information regarding the time taken by the user to enter text and the number of characters entered during the time.

Indicia 342 illustrates collection of user input information. For example, when the user enters text "hello welcome", the electronic device measures the time taken by the user to enter "hello" and "welcome" and counts the number of entered characters. For "hello", the electronic device may record the time at which the first character ('h') is entered as T1 and record the time at which the last character ('o') is entered as T2. The electronic device may measure the time taken by the user to enter "hello" by computing T2-T1.

The electronic device may count the number of characters in the input text. For example, the electronic device may count the number of characters contained in "hello" as five ('h', 'e', 'l', 'l', 'o').

The electronic device may arrange the user input information collected at operation S343 as indicated by indicia 344. The collected user input information may be used to compute or predict user input speed.

At operation S345, the electronic device collects currently assigned processor performance information. The processor performance information may be compared with the processor control information configured at operation S235 of FIG. 2 and be used to determine whether to control performance of at least one processing unit based on the processor control information. Specifically, when there is a mismatch between the processor control information and the processor performance information, the electronic device may control performance of a processing unit by utilizing the processor control information. The current processor performance information may be represented as indicated by indicia 346.

Figure 4A:
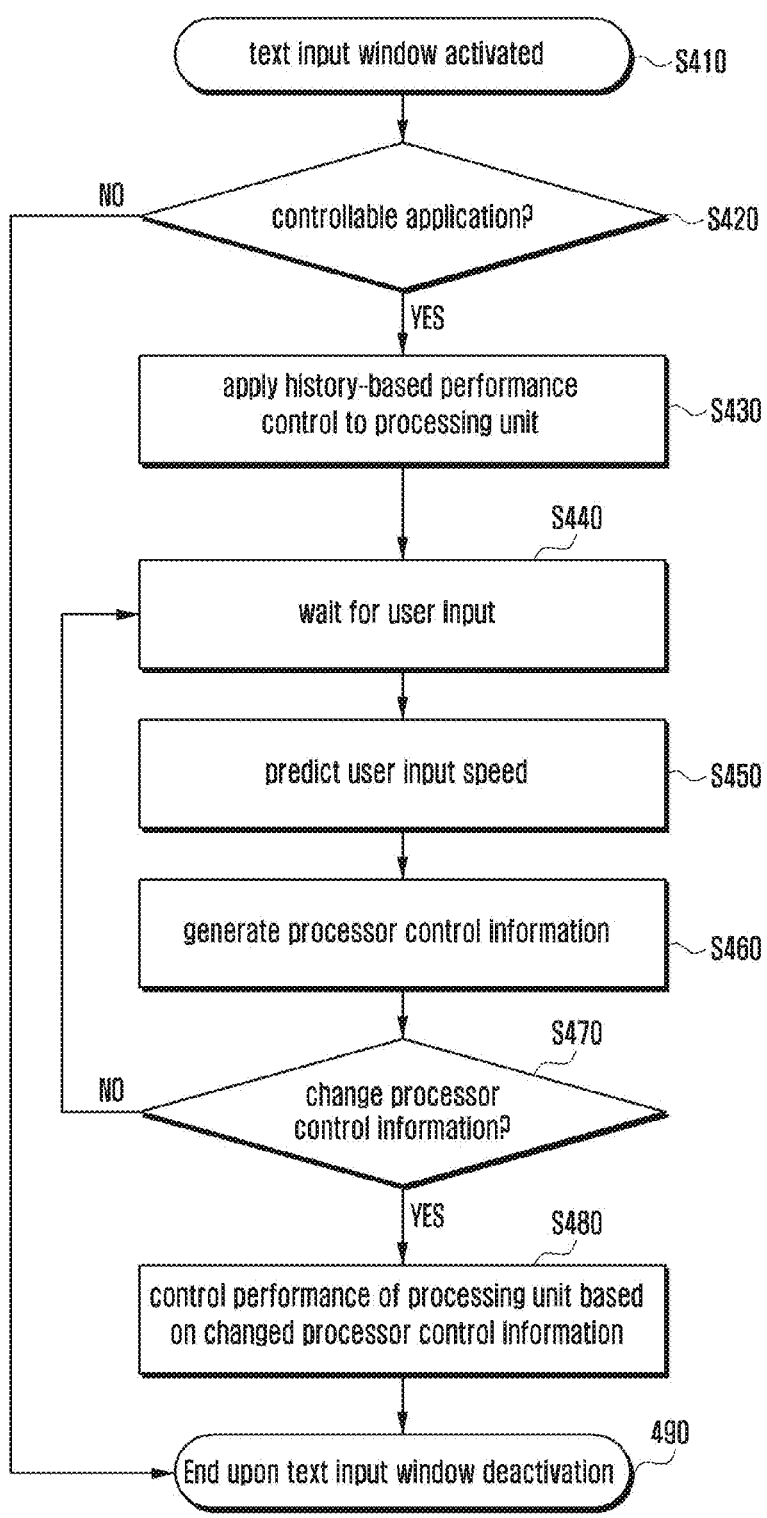
FIG. 4A is a flowchart of a procedure for controlling performance and resources of at least one processing unit according to an embodiment of the present disclosure.

FIG. 4A is a flowchart of a procedure for controlling performance of at least one processing unit according to an embodiment of the present disclosure.

Referring to FIG. 4A, when a text input window is activated at operations S410 and S420, the electronic device determines whether the current application is a controllable application. Determination regarding a controllable application is described in connection with FIGS. 3A and 3B.

Upon determining that the current application is not a controllable application, the electronic device ends the procedure upon text input window deactivation at operation S490. Upon determining that the current application is a controllable application, at operation S430, the electronic device may control performance of a processing unit on a historical basis. That is, the electronic device may control performance of a processing unit by use of previously used processor control information. The previously used processor control information may include processor control information used immediately before execution of the current application or most frequently used processor control information.

During history-based performance control, the electronic device may generate new processor control information to determine whether to apply new processor control information.

To generate new processor control information, at operation S450, the electronic device predicts user input speed. To this end, the electronic device may wait for user input at operation S440. To predict user input speed, user input speeds can be obtained and then averaged. A user input speed may be computed by diving the number of input characters forming one text string by the corresponding input time (e.g., information on the character count and input time may be obtained from the collected user input information).

At operation S460, the electronic device generates processor control information in accordance with the predicted user input speed. Specifically, the processor control information may be generated based on the user input speed and performance assignment information. The performance assignment information indicates pieces of control information mapped with user input speeds for controlling at least one processing unit constituting the electronic device. Use of the performance assignment information for generation of the processor control information is described later.

At operation S470, the electronic device compares the newly generated processor control information with the current processor performance information. If there is a mismatch between the new processor control information and the current processor performance information, at operation S480, the electronic device controls performance of a processing unit by utilizing the new processor control information. Thereafter, the electronic device ends the procedure upon text input window deactivation at operation S490.

If there is no mismatch between the new processor control information and the current processor performance information, the electronic device sustains the current state by returning to operation S440.

Figure 4B:
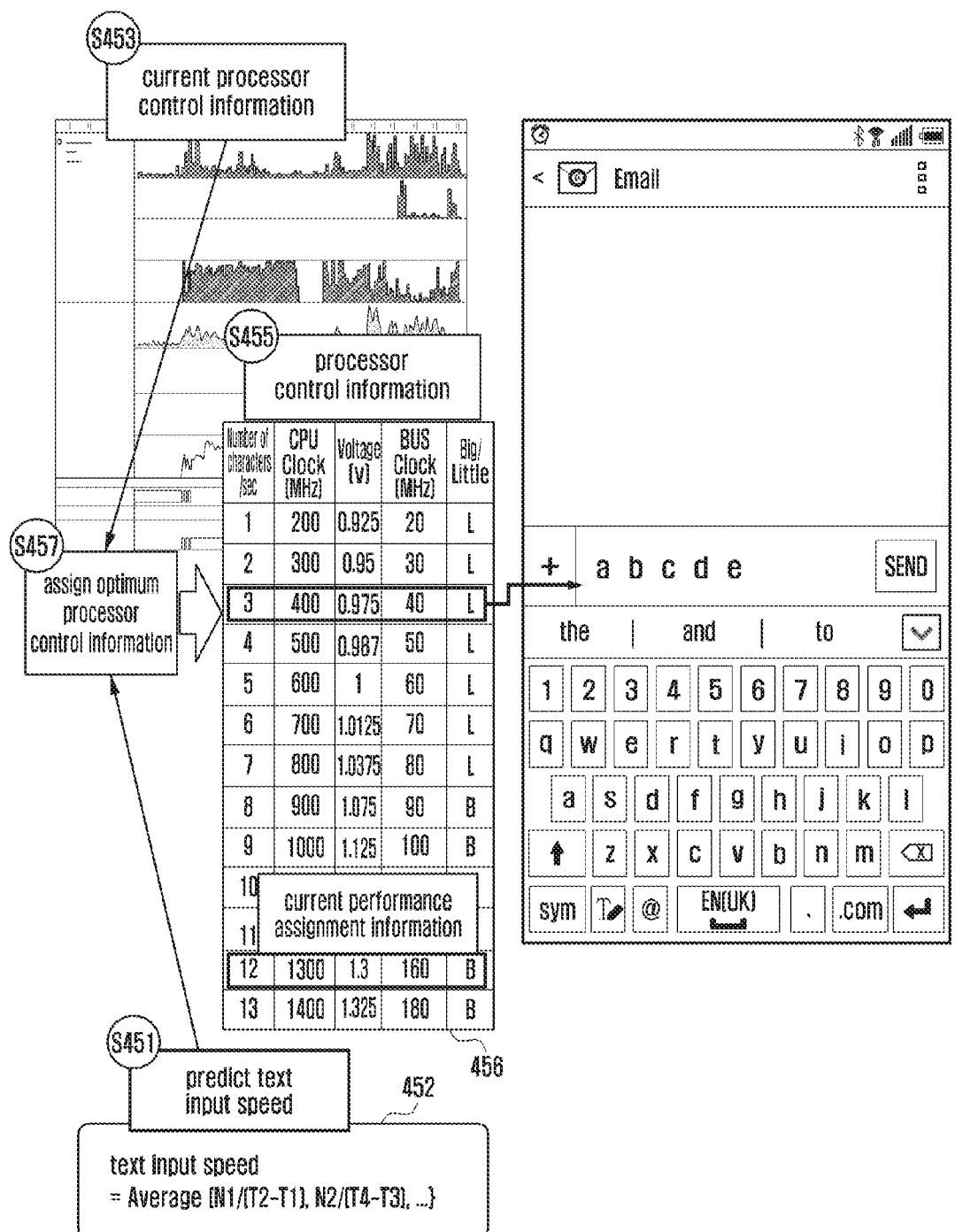
FIG. 4B depicts a series of operations to derive control information for performance and resources of at least one processing unit according to an embodiment of the present disclosure.

FIG. 4B depicts a series of operations to derive control information for performance of at least one processing unit according to an embodiment of the present disclosure.

Referring to FIG. 4B, at operation S451, the electronic device predicts user input speed. Prediction of user input speed is described at operation S450 of FIG. 4A and is illustrated by indicia 452.

As indicated by indicia 452, to predict input speed, individual user input speeds can be averaged.

At operation S453, the current processor control information is displayed.

At operation S455, the electronic device may generate processor control information based on performance assignment information. Indicia 456 indicates illustration of the performance assignment information.

The performance assignment information indicates pieces of control information mapped with user input speeds for controlling at least one processing unit constituting the electronic device. That is, the performance assignment information indicates instances of processor control information associated with user input speeds. For example, as indicated by indicia 456, processor control information for user input speed of 3 characters per second may be configured as central processing unit (CPU) clock rate of 400 MHz, voltage of 0.975 V, bus clock rate of 40 MHz, and Big/Little switch set to "little".

Hence, the electronic device may generate processor control information corresponding to the predicted user input speed by matching the predicted user input speed with the performance assignment information.

For example, when the predicted user input speed is 3 characters per second, the electronic device may generate processor control information composed of CPU clock rate of 400 MHz, voltage of 0.975 V, bus clock rate of 40 MHz, and Big/Little switch set to "little".

After generation of new processor control information, at operation S457, the electronic device assigns optimum processor control information. That is, the electronic device may determine whether to use the new processor control information or the current processor performance information. To this end, the electronic device compares the newly generated processor control information with the current processor performance information. If there is a mismatch therebetween, the electronic device controls performance of a processing unit by utilizing the new processor control information. Otherwise, if there is no mismatch, the electronic device controls performance of a processing unit by utilizing the current processor performance information.

FIG. 5 is an illustration of performance assignment information according to an embodiment of the present disclosure.

The electronic device may include an application processor (AP). The AP may include a CPU and a graphics processing unit (GPU). The performance assignment information is information on associations between user input speeds and CPU and GPU performances, and is a refined version of that indicated by indicia 456 of FIG. 4B. That is, the performance assignment information is composed of performance parameters including CPU clock rate, voltage, quality of service (QoS), multiple outstanding, and bandwidth limit optimized for a user input speed. For example, when the user input speed is 3 characters per second, the electronic device may use the performance assignment information to set a clock rate of 400 MHz, QoS of "high", a voltage of 0.95V for the CPU and set a clock rate of 177 MHz, QoS of "high", a voltage of 0.9V for the GPU.

The performance assignment information may be prepared and stored in the storage unit in advance. The performance assignment information may also be received from another electronic device.

When the electronic device is upgraded, the performance assignment information may be updated. For example, when software of the electronic device is upgraded, the CPU may operate with less power consumption. In this case, the electronic device may use new performance assignment information. As such, the electronic device may receive updated performance assignment information from another electronic device. The electronic device may also compute new performance assignment information.

When the AP includes multiple CPUs, the performance assignment information may include a control indication to the number of CPUs to be used. For example, when the user input speed is low, the performance assignment information may be configured so as to indicate use of one CPU among the multiple CPUs.

When the user input speed increases, the performance assignment information may be configured so as to increase the CPU clock rate. Alternatively, when the user input speed increases, the performance assignment information may be configured so as to activate one of the idle CPUs.

For example, for user input speed of 1 character per second, assume that the AP includes four CPUs and one CPU operates at a clock rate of 200 MHz. For user input speed of 3 characters per second, assume that the electronic device exhibits the same performance when one CPU operates at a clock rate of 400 MHz and when two CPUs operate at a clock rate of 200 MHz. In this case, the performance assignment information may be configured so as to minimize the amount of power consumed by the electronic device.

In another embodiment, assume that operating two CPUs at a clock rate of 200 MHz exhibits higher performance with larger power consumption in comparison to operating one CPU at a clock rate of 400 MHz. In this case, the electronic device may determine CPU operation according to a given environmental factor. For example, when the remaining battery power is less than or equal to 30 percent, the performance assignment information may be configured so as to operate one CPU at a clock rate of 400 MHz for minimization of power consumption. In contrast, when the remaining battery power is greater than 30 percent, the performance assignment information may be configured so as to operate two CPUs at a clock rate of 200 MHz for smooth user input. The performance assignment information may be configured with respect to the number of applications in execution and the amount of power consumed. The present disclosure is not limited thereto, and the performance assignment information may be configured with respect to various other criteria.

As described above, the performance assignment information may include, for each user input speed, an indication to CPU operation and an indication to a CPU clock rate. Hence, the electronic device may control individual CPUs according to the performance assignment information.

Figure 6:
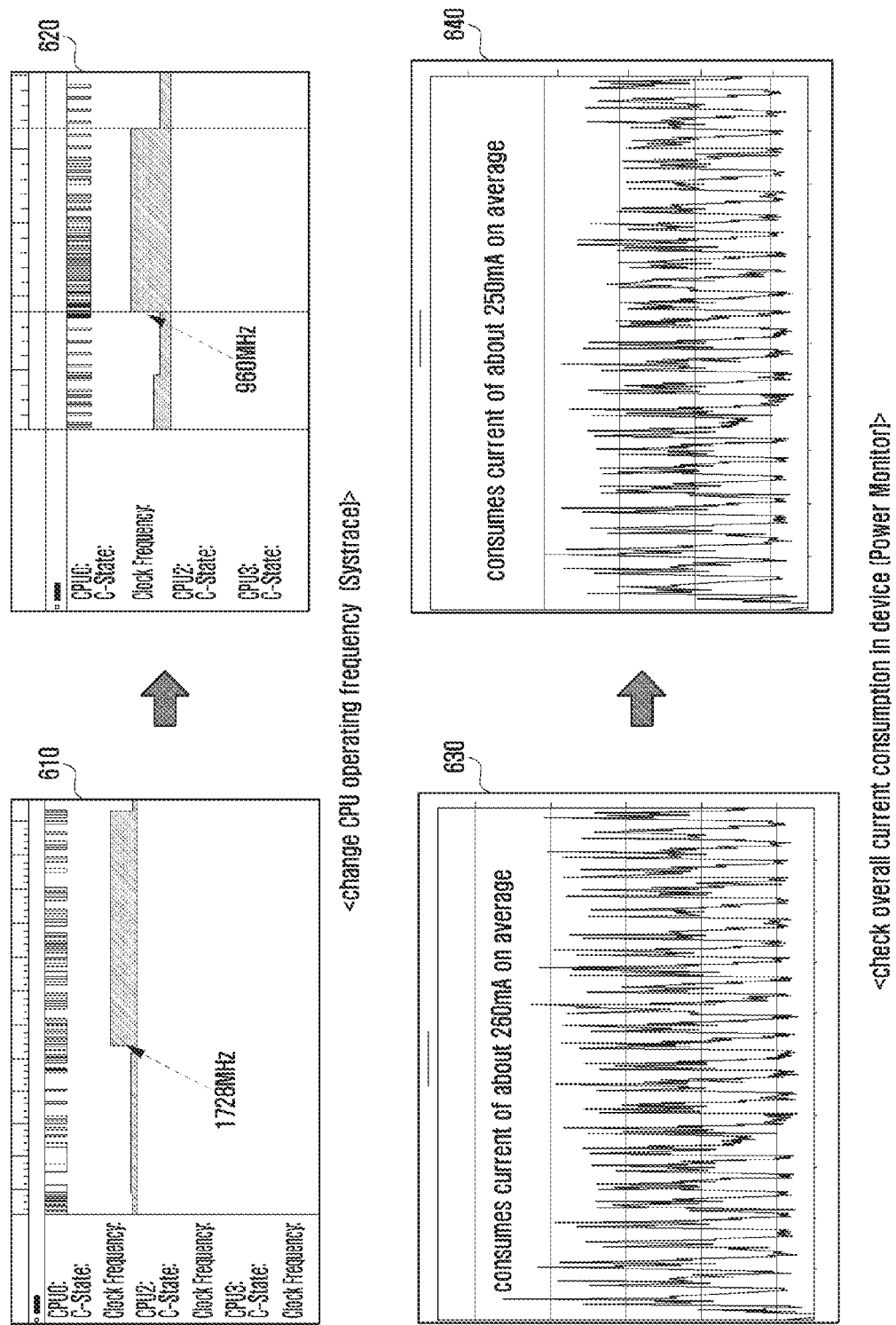
FIG. 6 illustrates measurement of power consumption according to an embodiment of the present disclosure.

FIG. 6 illustrates measurement of power consumed in the electronic device according to an embodiment of the present disclosure.

Referring to FIG. 6, indicia 610 indicates CPU clock rates when performance of a processing unit is not controlled, and indicia 630 indicates the amount of current consumed when performance of the processing unit is not controlled. Here, it can be seen that the electronic device operates at a CPU clock rate of 1728 MHz with current consumption of 260 mA when performance control is not applied.

Indicia 620 indicates CPU clock rates when performance of a processing unit is controlled, and indicia 640 indicates the amount of current consumed when performance of the processing unit is controlled. Here, it can be seen that the electronic device operates at a CPU clock rate of 960 MHz with current consumption of 250 mA when performance control is applied.

Hence, it can be seen that controlling performance of a processing unit may decrease the CPU clock rate from 1728 MHz to 960 MHz and reduce current consumption by 10 mA in the electronic device. In other words, it is possible to reduce unnecessary power consumption by controlling performance of a processing unit.

FIG. 7 is a flowchart of a procedure for controlling performance of at least one processing unit in real time according to an embodiment of the present disclosure.

Unlike the above embodiment, the electronic device may collect user input information and control performance of a processing unit so that the user input information is reflected in real time.

Referring to FIG. 7, when a text input window is activated at operations S710 and S720, the electronic device determines whether the current application is a controllable application.

Upon determining that the current application is not a controllable application, the electronic device ends the procedure for processing unit performance control. Upon determining that the current application is a controllable application, at operation S730, the electronic device collects user input information. The user input information may include information regarding the time taken by the user to enter text and the number of characters entered during the time. The user input information may also include current processor performance information.

After collection of the user input information, at operation S740, the electronic device determines whether to control performance of at least one processing unit. Upon determining not to control performance of a processing unit, the electronic device ends the procedure for processing unit performance control.

Upon determining to control performance of a processing unit, at operation S750, the electronic device configures processor control information by use of the user input information collected at operation S730. Configuration of processor control information is identical to that described in connection with FIGS. 4A and 4B.

However, unlike the case described in FIGS. 4A and 4B where pre-collected user input information is used to configure processor control information, processor control information is configured in consideration of real-time user input in the present embodiment.

After configuration of processor control information, at operation S760, the electronic device controls performance of a processing unit based on the configured processor control information.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device capable of controlling at least one processing unit, the electronic device comprising:
   a transceiver;
   an input unit configured to sense user input; and
   a controller configured to:
      identify user input speed based on a result of sensing the user input,
      determine control information corresponding to the user input speed to control the at least one processing unit from performance information, the performance information including at least one control information mapped respectively with each user input speed, and
      control the at least one processing unit to operate based on the control information,
   wherein the performance information includes at least one of central processing unit (CPU) clock information, voltage information, bus clock information, or switch type information, and
   wherein a number of the at least one processing unit to be controlled is determined based on the control information and a remaining battery charge amount.

2. The electronic device of claim 1, wherein, when a text input window is activated, the controller is configured to detect reception of the user input.

3. The electronic device of claim 1, wherein the controller is configured to identify the user input speed based on at least one of collected user input information or current user input information.

4. The electronic device of claim 3, wherein the controller is configured to identify the user input speed by computing individual input speeds using the at least one of the collected user input information or the current user input information and averaging the computed input speeds.

5. The electronic device of claim 4, wherein the controller is configured to compute an input speed by dividing the number of characters forming a text string by a corresponding input time.

6. The electronic device of claim 1, wherein the controller is configured to control performance of an application processor (AP) of the electronic device.

7. The electronic device of claim 6, wherein the AP comprises at least one CPU and at least one graphics processing unit (GPU).

8. The electronic device of claim 6, wherein the controller is configured to control AP performance by controlling at least one of CPU clock rate, voltage, bus clock rate, or a switch type.

9. An electronic device capable of controlling at least one processing unit, the electronic device comprising:
   a transceiver;
   an input unit configured to sense user input; and
   a controller configured to:
      collect user input information based on a result of sensing the user input,
      identify user input speed based on the collected user input information,
      determine control information corresponding to the user input speed to control the at least one processing unit from performance information, the performance information including at least one control information mapped respectively with each user input speed, and
      control the at least one processing unit to operate based on the control information,
   wherein the performance information includes at least one of central processing unit (CPU) clock information, voltage information, bus clock information, or switch type information, and
   wherein a number of the at least one processing unit to be controlled is determined based on the control information and a remaining battery charge amount.

10. A method for controlling performance of an electronic device, the method comprising:
    sensing user input;
    identifying user input speed based on a result of sensing the user input;
    determining control information corresponding to the user input speed to control the at least one processing unit from performance information, the performance information including at least one control information mapped respectively with each user input speed; and
    controlling the at least one processing unit to operate based on the control information,
    wherein the performance information includes at least one of central processing unit (CPU) clock information, voltage information, bus clock information, or switch type information, and
    wherein a number of the at least one processing unit to be controlled is determined based on the control information and a remaining battery charge amount.

11. The method of claim 10, wherein the sensing of the user input comprises detecting the user input when a text input window is activated.

12. The method of claim 10, wherein the identifying of the user input speed comprises identifying the user input speed based on at least one of collected user input information or current user input information.

13. The method of claim 12, wherein the identifying of the user input speed comprises:
    computing individual input speeds using the at least one of the collected user input information or the current user input information; and
    averaging the computed input speeds.

14. The method of claim 13, wherein an input speed is computed by dividing the number of characters forming a text string by a corresponding input time.

15. The method of claim 10, wherein the controlling of the at least one processing unit comprises controlling performance of an application processor (AP) of the electronic device.

16. The method of claim 15, wherein the AP comprises at least one CPU and at least one graphics processing unit (GPU).

17. The method of claim 15, wherein the controlling of AP performance comprises controlling at least one of CPU clock rate, voltage, bus clock rate, or a switch type.

18. At least one non-transitory processor readable medium for storing a computer program of instructions configured to be readable by at least one processor for instructing the at least one processor to execute a computer process for performing the method as recited in claim 10.

19. A method for controlling performance of an electronic device, the method comprising:
    sensing user input;
    collecting user input information based on a sensing result of sensing the user input;
    identifying user input speed based on the collected user input information;

determining control information corresponding to the user input speed to control the at least one processing unit from performance information, the performance information including at least one control information mapped respectively with each user input speed; and controlling the at least one processing unit to operate based on the performance information, wherein the performance information includes at least one of central processing unit (CPU) clock information, voltage information, bus clock information, or switch type information, and wherein a number of the at least one processing unit to be controlled is determined based on the control information and a remaining battery charge amount.

20. At least one non-transitory processor readable medium for storing a computer program of instructions configured to be readable by at least one processor for instructing the at least one processor to execute a computer process for performing the method as recited in claim 19.

* * * * *